J. F. PICKERILL.
INDICATOR ATTACHMENT FOR BALING PRESSES.
APPLICATION FILED OCT. 28, 1913.
1,113,824.
Patented Oct. 13, 1914.
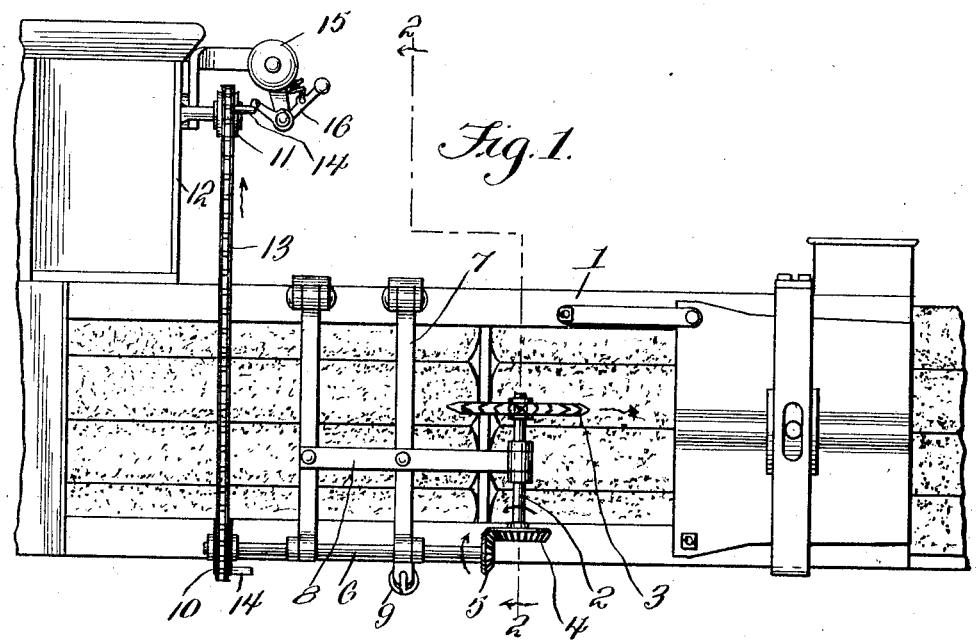
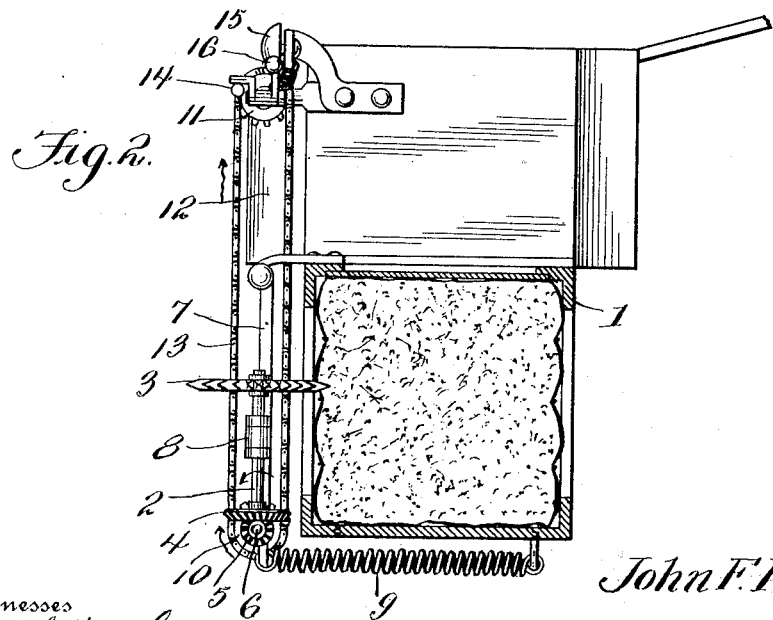
Inventor
John F. Pickerill
Witnesses
By Victor J. Evans
Attorney

UNITED STATES PATENT OFFICE.

JOHN FRANK PICKERILL, OF BUTLER, ILLINOIS.

INDICATOR ATTACHMENT FOR BALING-PRESSES.

1,113,824.     Specification of Letters Patent.     Patented Oct. 13, 1914.

Application filed October 28, 1913. Serial No. 797,829.

*To all whom it may concern:*

Be it known that I, JOHN F. PICKERILL, a citizen of the United States, residing at Butler, in the county of Montgomery and State of Illinois, have invented new and useful Improvements in Indicator Attachments for Baling-Presses, of which the following is a specification.

This invention has relation to attachments for baling presses and it consists in the novel features hereinafter described and claimed.

An object of the invention is to provide an attachment of the character stated which is adapted to indicate or show when a bale is completed in a press in order that the dividing blocks or boards may be inserted in the press at the proper time to maintain the proper standard of size of the bale.

With the above object in view the attachment comprises a wheel which is adapted to be engaged by the hay as it moves through the press the same wheel being mounted upon a shaft and the movement rotates the wheel and the shaft. The said shaft is operatively connected with an indicator mechanism which carries a button to an elevated point and the arrival of the button at the said point shows to the operators that the bale has arrived at the predetermined proportions and it is then time to insert the board or block in the press.

In the accompanying drawings:—Figure 1 is a side elevation of a press with the attachment applied. Fig. 2 is a transverse sectional view of the same cut on the line 2—2 of Fig. 1.

As shown in the accompanying drawing the press 1 is of any usual pattern and the indicator comprises a shaft 2 which is journaled upon the press. A dentate wheel 3 is attached to the shaft 2 and is adapted to be engaged by the hay as the hay is forced through the press. A beveled pinion 4 is fixed to the shaft 2 and meshes with a beveled pinion 5 fixed to a shaft 6 journaled in arms 7 hinged at the side of the press. Arms 7 support a bar 8 in an end portion in which the shaft 2 is journaled. A spring 9 is attached at one end to one of the arms 7 and at its other end is attached to the press 1 and the said spring is under tension with a tendency to draw the wheel 3 toward the hay. A sprocket wheel 10 is fixed to the shaft 6 and sprocket wheel 11 is journaled upon a standard 12 mounted upon the press 1. A sprocket chain 13 is trained around the sprocket wheels 10 and 11 and is provided at intervals with buttons 14. The buttons 14 are spaced from each other and when ever a button 14 moves vertically over the center of the sprocket wheels 11 this is an indication that the bale in the press has arrived at a desired predetermined size and that it is time to insert the block in the press.

As the bale is being formed in the press and the hay is being forced through the same the hay comes in contact with the wheel 3 and turns the same. Thus the shaft 2 is rotated and the intermeshing pinions 4 and 5 rotate the shaft 6 which in turn rotates the sprocket wheel 10. The chain 13 rotates the sprocket wheel 11 as the said chain moves about the said sprocket wheels.

A bell 15 is mounted at the upper portion of the standard 12 and one end of the stem of a spring held clapper 16 is projected into the path of movement of the buttons 14. Thus as the buttons come in contact with the stem of the clapper 16 the said clapper is swung and as the buttons leave the clapper, the spring of the same swings the clapper back and causes the same to strike the bell and give an alarm which signifies that a bale is completed.

Thus it will be seen that an attachment of simple structure is provided which will indicate the completion of the bale in the press and when this attachment is employed all of the bales will be of the same length or size.

Having described the invention what is claimed is:—

A press attachment comprising a frame pivoted to the press, spring means for holding the frame toward the press, a shaft journaled for rotation in the frame and having a wheel adapted to be engaged by the material which is passed through the press, a second shaft journaled for rotation in the frame, means for rotating the second shaft from the first mentioned shaft, a sprocket wheel carried by the last mentioned shaft, a sprocket wheel journaled upon the press, a chain trained around the sprocket wheels, and buttons carried by the chain, said buttons adapted by their arrival at a predetermined point to indicate the completion of the bale.

In testimony whereof I affix my signature in presence of two witnesses.

JOHN FRANK PICKERILL.

Witnesses:
JOHN E. BARNES,
WM. G. COOPER.

Copies of this patent may be obtained for five cents each, by addressing the "Commissioner of Patents, Washington, D. C."